(12) United States Patent
Riant et al.

(10) Patent No.: US 7,024,075 B2
(45) Date of Patent: Apr. 4, 2006

(54) REDUCING INSERTION LOSSES OF A WRITTEN IN GRATING WITH MODE COUPLING IN THE CLADDING

(75) Inventors: Isabelle Riant, Orsay (FR); Carlos De Barros, Boulogne-Billancourt (FR); Michel Jurczyszyn, Ivry sur Seine (FR); Pierre Sansonetti, Palaiseau (FR)

(73) Assignee: Avanex Corporation, Fremont, CA (US)

( * ) Notice: Subject to any disclaimer, the term of this patent is extended or adjusted under 35 U.S.C. 154(b) by 127 days.

(21) Appl. No.: 10/220,065

(22) PCT Filed: Mar. 1, 2001

(86) PCT No.: PCT/FR01/00609

§ 371 (c)(1),
(2), (4) Date: Aug. 28, 2002

(87) PCT Pub. No.: WO01/65290

PCT Pub. Date: Sep. 7, 2001

(65) Prior Publication Data
US 2003/0016912 A1    Jan. 23, 2003

(30) Foreign Application Priority Data
Mar. 3, 2000    (FR) .................................. 00 02751

(51) Int. Cl.
G02B 6/34    (2006.01)
(52) U.S. Cl. .......................................... 385/37; 398/87
(58) Field of Classification Search ............ 385/27–29, 385/37, 123, 124, 10; 398/84, 85, 87
See application file for complete search history.

(56) References Cited

U.S. PATENT DOCUMENTS

| 5,641,956 | A | * | 6/1997 | Vengsarkar et al. ... 250/227.14 |
| 5,694,248 | A |   | 12/1997 | Erdogan et al. |
| 5,712,715 | A | * | 1/1998 | Erdogan et al. ............... 359/8 |
| 5,740,292 | A | * | 4/1998 | Strasser ....................... 385/37 |
| 5,852,690 | A | * | 12/1998 | Haggans et al. .............. 385/37 |
| 6,021,242 | A | * | 2/2000 | Harumoto et al. ............ 385/37 |

(Continued)

FOREIGN PATENT DOCUMENTS
EP    0767391 A2    4/1997

(Continued)

*Primary Examiner*—Edward J. Glick
*Assistant Examiner*—Thomas R. Artman
(74) *Attorney, Agent, or Firm*—Patterson & Sheridan, LLP.

(57) ABSTRACT

The invention relates to an optical fiber presenting a core, cladding, and a grating written by irradiation and coupling at least one light mode into the cladding so that it is dissipated therein. The invention proposes causing the mean index to vary progressively along the grating, at least at the ends of the grating. The progressive variation in mean index or in the amplitude of index modulation for writing the grating serves to limit insertion losses to the filter formed by the grating. Analogously, in a written-in grating, the invention provides the equivalent of progressively varying the core size of the fiber for interconnecting two optical fibers presenting different core diameters. The invention is applicable in particular to gain-equalizing filters in WDM transmission systems.

16 Claims, 4 Drawing Sheets

U.S. PATENT DOCUMENTS

| | | |
|---|---|---|
| 6,104,852 A | 8/2000 | Kashyap |
| 6,130,973 A * | 10/2000 | Lauzon et al. ............... 385/37 |
| 6,253,008 B1 * | 6/2001 | Harumoto et al. ............ 385/37 |
| 6,266,463 B1 * | 7/2001 | Laming et al. ............... 385/37 |
| 6,321,008 B1 * | 11/2001 | Riant et al. .................. 385/37 |
| 6,360,038 B1 * | 3/2002 | Grubsky ...................... 385/28 |
| 6,404,956 B1 * | 6/2002 | Brennan et al. .............. 385/37 |
| 6,574,395 B1 * | 6/2003 | Mechin et al. ............... 385/37 |
| 6,842,544 B1 * | 1/2005 | Eldada ......................... 385/10 |
| 2003/0107787 A1 * | 6/2003 | Bablumyan .................. 359/15 |

FOREIGN PATENT DOCUMENTS

| | | |
|---|---|---|
| EP | 0893712 A2 | 1/1999 |

* cited by examiner

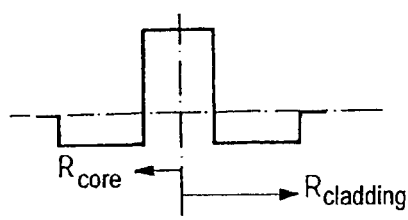
FIG_1
(PRIOR ART)
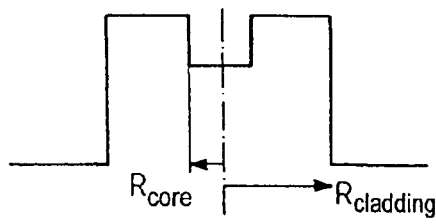
FIG_2
(PRIOR ART)
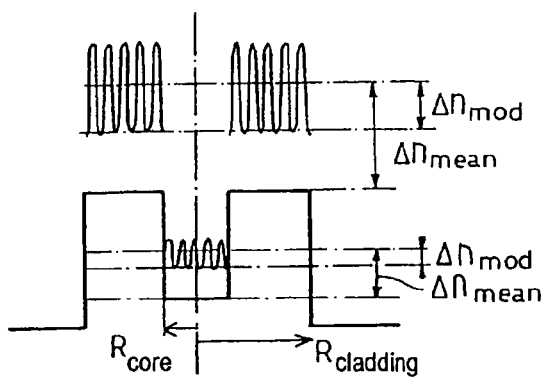
FIG_3
(PRIOR ART)
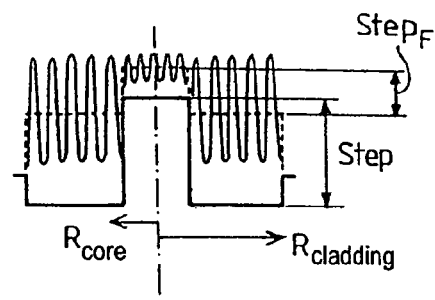
FIG_4
(PRIOR ART)
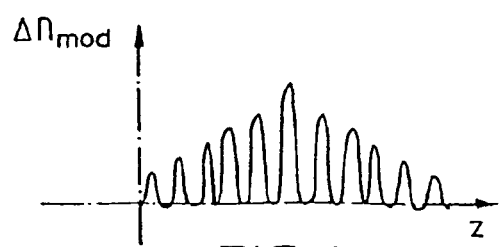
FIG_5

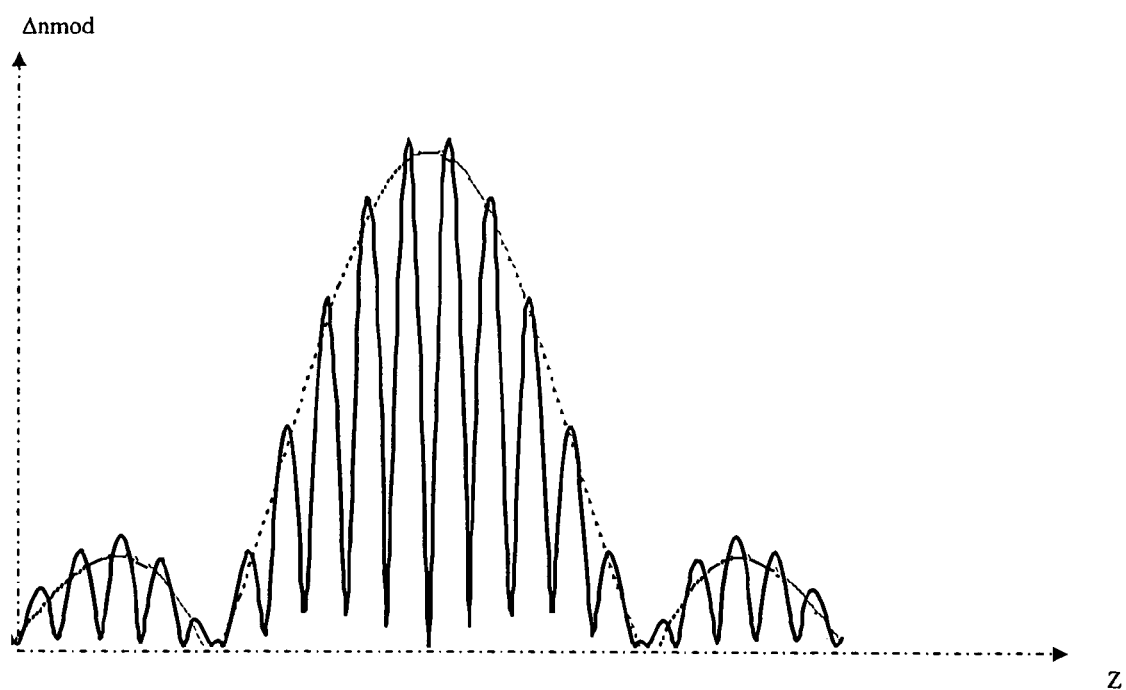
FIG_5A

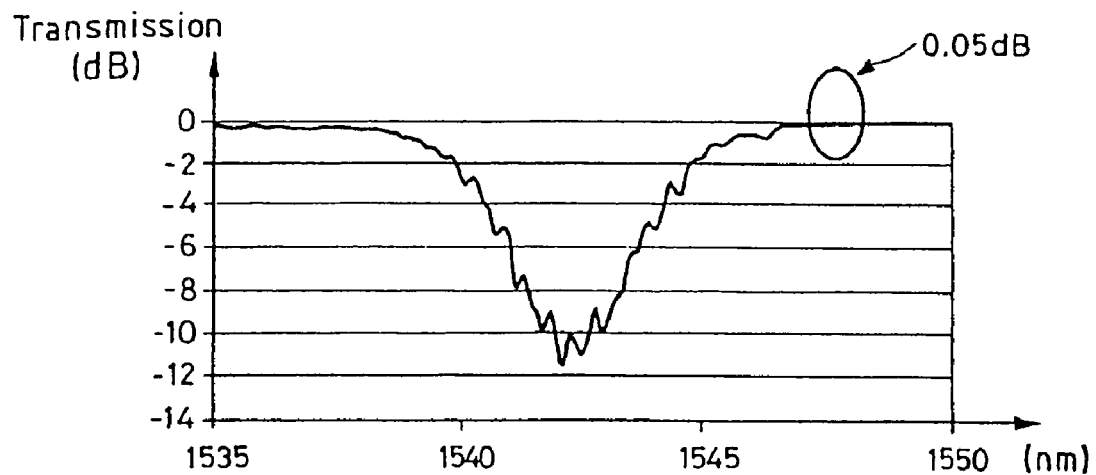
FIG_6
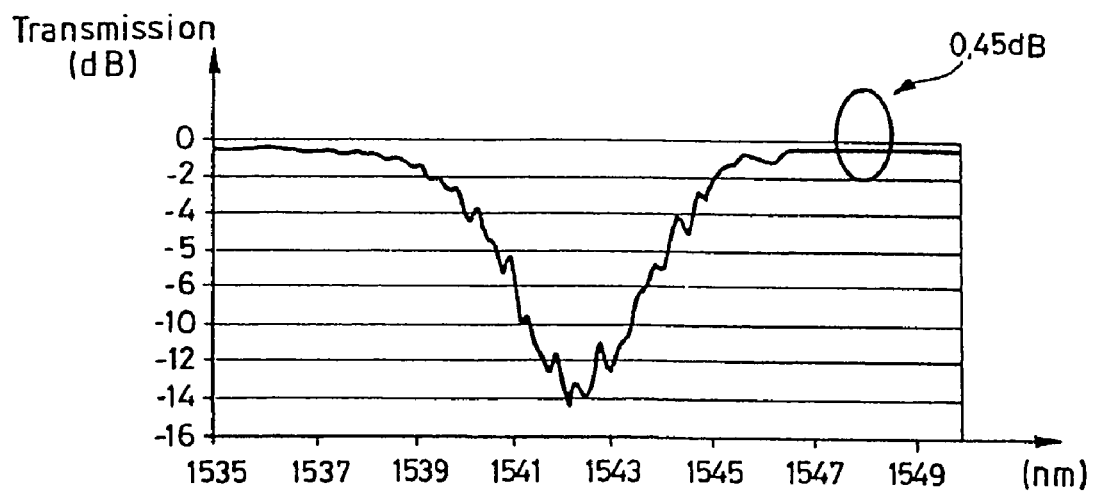
FIG_7

REDUCING INSERTION LOSSES OF A WRITTEN IN GRATING WITH MODE COUPLING IN THE CLADDING

The invention relates to the field of optical filters, and more particularly to optical filters constituted by gratings written in optical fibers. Such gratings are formed in a fiber by periodic or substantially periodic modulation of the index of the fiber along the longitudinal axis of the fiber; the term "pitch" is used to designate the period of the modulation along the fiber. Such gratings are commonly formed by irradiation using ultraviolet light and a fiber that is doped so as to be photosensitive.

For wavelength division multiplex (WDM) transmission systems there arises a problem of equalizing amplifier gain. It is important for the amplifiers which are located at regular intervals in the system to present gain response that is as uniform as possible throughout the entire range of wavelengths used in transmission. It is known to make use of filters in order to improve the flatness of amplifier gain and to ensure that gain is equalized over the entire working bandwidth.

FR-A-2 779 238, FR-A-2 779 239, and FR-A-2 779 240 describe optical filters obtained by writing gratings in optical fibers. The gratings proposed in those documents present index variation not only in the core of the fiber but also in the cladding. Furthermore, the gratings in said filters are written so as to be inclined relative to the longitudinal axis of the fiber; as a result, modes are coupled into the cladding of the fiber where they are damped. Under such circumstances, the characteristic of the filter is constituted by the envelope of the couplings of the various modes into the cladding of the fiber. Those filters are intended for use as equalizing filters in WDM transmission systems.

Other types of written-in grating and Bragg filters are also known. L. R. Chen and P. W. E. Smith in "Fibre Bragg grating transmission filters with near-ideal filter response", Electronics Letters, Vol. 34, No. 21, October 1998, pp. 2048–2050, proposes moiré filters that present "chirp", i.e. pitch variation along the filter. Proposals have also been made to apodize the filter, i.e. to vary the fiber modulation index as a function of its length. By way of example, T. A. Strasser et al. in "UV-induced fiber grating OADM devices for efficient bandwidth utilization", OFC' 96, PD8-2 to PDB-4 proposes a filter presenting Gaussian apodization, i.e. the envelope as a function of fiber index modulation is Gaussian. The filter does not present chirp and its modulation pitch is constant. The purpose of such apodization is to ensure that the mean index remains constant in order to avoid the effect known as "self-chirp". Self-chirp is variation in mean index along the grating resulting in the spectral response of the filter becoming asymmetrical.

The invention relates to the novel problem of insertion losses when installing such filters formed by inclined written-in gratings in transmission systems. This problem is particularly important with the filters described in the Applicants' above-mentioned patent applications, as explained below.

In general, it is known that interconnecting two sections of optical fiber that present different profiles can give rise to insertion losses. The conventional solution to that problem for fibers that present different core diameters consists in mechanically drawing down the fiber having the larger core diameter so as to reduce said core diameter progressively. It is then possible to interconnect the fiber presenting the smaller core diameter and the fiber that has been drawn down in this way. That conventional solution is complicated to implement in reliable and reproducible manner.

The invention proposes a solution to this novel problem. It ensures that the filter constituted by an inclined written-in grating presents low insertion losses, but without that requiring the fiber to be drawn down as in the state of the art.

More precisely, as shown in FIG. 1A, the invention proposes an optical fiber 100 presenting a core 110, cladding 120, and a grating 130 written by irradiation and coupling at least one light mode into the cladding, the fiber 100 being characterized in that the mean index of the fiber 100 varies along the grating 130, at least at the ends of the grating 130. See, e.g., FIG. 5.

In an embodiment, the grating is written in the core of the fiber. It can also or alternatively be written in the cladding of the fiber.

The grating is advantageously an inclined grating, or a long period grating.

In an embodiment, the grating presents varying pitch.

Preferably, the mean index varies progressively at the ends of the grating; in particular it may vary linearly at the ends of the grating.

In an embodiment, the mean index varies so that the insertion losses are less than 0.3 decibels (dB).

Advantageously, the index modulation amplitude for writing the grating varies at each end of the grating from a zero value at the end of the grating.

The invention also proposes a gain-equalizing filter constituted by such a fiber, and a transmission system including at least one gain-equalizing filter constituted by such a fiber.

Other characteristics and advantages of the invention appear on reading the following description of embodiments given by way of example only, and with reference to the figures, in which:

FIGS. 1 and 2 are graphs showing index profile and photosensitivity profile in a prior art fiber;

FIG. 3 shows index variations induced by writing a grating in such a fiber;

FIG. 4 shows the index profile that results from writing the grating in the fiber of FIGS. 1 to 3;

FIG. 5 is a diagram showing how index varies in a filter of the invention;

FIG. 6 shows the transfer function of a filter of the invention; and

FIG. 7 is an analogous figure for a prior art filter.

Figure 1A:
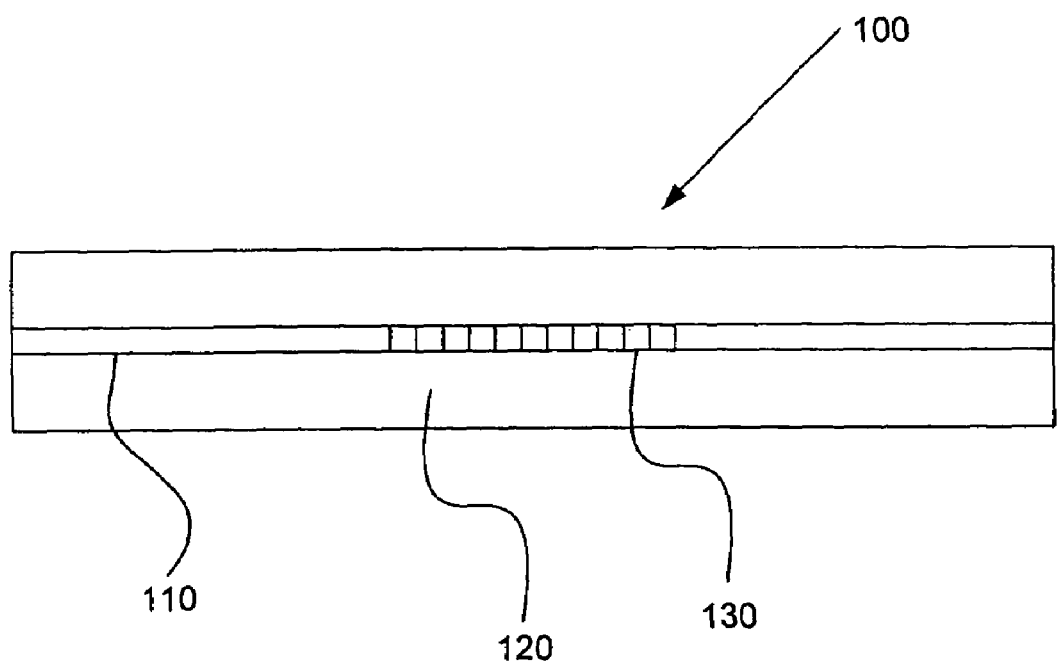

The invention applies to any grating written in an optical fiber and in which modes are coupled into the cladding in order to be dissipated therein; an example of such gratings is given in the above-mentioned patent applications, in which writing is inclined and in which writing is also performed in the cladding. The reflected light is coupled into the cladding in a plurality of modes. Another example of such gratings is constituted by gratings coupling a portion of the incident light into a forward cladding mode. Such gratings are said to be "long-period" gratings since their period is greater by three orders of magnitude than the period of standard Bragg gratings. Typically, it is possible to take into consideration periods of about 500 micrometers (μm) instead of periods of about 0.5 μm for conventional Bragg gratings, but these values are not limiting. A. M. Vengsarker et al. in "Long period fiber-grating-based gain equalizers", Optics Letters, Vol. 21, No. 5 (1996), pp. 336–338, gives an example of such long-period gratings.

To diminish the insertion losses of such gratings in optical transmission systems, the invention proposes controlling the mean index variations of the fiber at the ends of the grating, i.e. at the interfaces between the irradiated zone and the non-irradiated zone. More precisely, the invention proposes causing the mean index of the fiber to vary progressively, i.e. causing the amount of index modulation that is used for writing the gratings to vary at the ends of the grating. As explained below, this progressive variation of the index at the ends of the grating achieves progressive variation of the index profile at the ends of the written-in grating and performs a function equivalent to that of a section of fiber obtained by mechanical drawing down in which the index profile varies progressively.

The invention differs from apodization as described in the above-mentioned article by T. A. Strasser et al. In a grating written with apodization, as described in that document, the purpose of the apodization is to improve the transfer function of the filter, in particular by eliminating the "lobes" that appear on the edges of the transfer function on either side of the central wavelength of the filter. In such a configuration, progressive index variation of the type of the invention is not conceivable since it would have the effect of eliminating the effects of apodization, at least on an edge of the transfer function. It is therefore essential for the mean index to remain constant. Conversely, in gratings of the invention, variation in the mean index at the ends of the grating is without incidence. For angle gratings, variations in mean index at the ends of the grating have the effect of making the transfer function of each mode coupled into the cladding asymmetric. This has little incidence on the overall transfer function of the filter. For long-period gratings, the mean index variations at the ends of the grating can induce changes in the shape of the transfer function, but they remain acceptable.

The invention relies on the fact that variations in photo-sensitivity in the fiber in which the grating is written induce variations in index difference between the cladding and the core while the grating is being written, or more generally they induce variations in index profile. This is explained below with reference to the example given in the above-mentioned patent applications. FIGS. 1 and 2 are graphs showing index profile and photosensitivity profile in a prior art fiber. In conventional manner, index (or photosensitivity as the case may be) is plotted up the ordinate, and radius measured from the center of the fiber is plotted along the abscissa. FIG. 1 shows the index profile of the fiber in the absence of irradiation. This is a step index profile with buried cladding. In other words, starting from the center, the fiber presents a first zone or "core" of substantially constant index that is greater than the index of the outer cladding over a radius Rcore Around the core, the fiber presents an annular zone or cladding having index that is substantially constant and lower than the index of the outer cladding. This zone extends between radii $R_{core}$ and $R_{cladding}$. Around this annular zone there extends the outer cladding of the fiber.

FIG. 2 is a corresponding graph showing variation in the photosensitivity of the fiber. As explained in the above-mentioned patent applications, the fiber has reduced photosensitivity in the core so as to achieve a greater increase of index in the buried cladding while writing the grating. The photosensitivity of the fiber is thus lower in the first zone than in the annular zone surrounding it.

FIG. 3 shows how index variations are induced by writing a grating in such a fiber. For irradiation with light of given intensity, index variation in the core is smaller than in the cladding because the photosensitivity in the core is lower than in the cladding. FIG. 3 shows the photosensitivity profile superimposed on the intensity of index variant in the core and in the cladding. Since photosensitivity in the cladding is greater than in the core, index variations in the cladding, $\Delta n_{mod}$ in FIG. 3, are greater in the cladding than in the core. The mean index variation induced by the writing operation, $\Delta n_{mean}$ in FIG. 3, is thus greater in the cladding zone than in the core zone.

FIG. 4 shows the index profile that results from writing. The continuous line shows the index profile prior to writing, and the dashed line shows the mean index profile after writing. Fine lines show how index is modulated as a result of writing. As already explained with reference to FIG. 3, the increase of index in the core is smaller than the increase of index in the cladding. As a result, the index difference between the core and the cladding prior to irradiation, marked $Step_i$ in the figure, is greater than the index difference between the cladding and the core after irradiation, marked $Step_F$ in the figure. The invention relies on the observation that this index difference can be the cause of insertion losses into a transmission grating of the filter formed by the written-in grating.

The effect of writing on the index profile is described in detail with reference to FIGS. 1 to 4 for a specific fiber, a fiber having greater photosensitivity in the cladding than in the core. This effect also occurs in a fiber which is photo-sensitive in the core only. Under such circumstances, irradiating the fiber increases the mean index in the core so that the index difference between the cladding and the core increases.

In all cases, irradiating a fiber that presents zones of different photosensitivity gives rise to a variation in the mean index profile. This variation in the mean index profile can give rise to losses. These losses are encountered firstly on passing from the non-written zone into the grating zone, and secondly on passing from the grating zone into the non-written zone.

The invention proposes a solution to this novel problem. It proposes controlling index variation so as to limit losses. To do this, one solution consists in causing the amplitude of index modulation to vary progressively, at least at the ends of the grating. Progressive variation in the amplitude of the index modulation written in the grating gives rise to progressive variation in the index profile at the ends of the grating. The progressive nature of this variation limits losses on entering and leaving the grating.

FIG. 5 is a diagram showing index variation in a filter of the invention. The distance along the fiber is plotted along the abscissa and index difference as induced by writing the grating in the fiber is plotted up the ordinate. As can be seen in the figure, index difference is zero or small at the ends of the grating and increases progressively. In the example of FIG. 5, the grating is constituted essentially by a first portion in which index increases, and a second portion in which index decreases. It will be understood that it would also be possible to provide between these two portions a third portion in which modulation amplitude is different, for example in which modulation amplitude is constant.

The variation at each end of the grating can be defined as follows. Modulation amplitude may vary in linear, exponential, quadratic, Gaussian, or in any other manner. It may be continuous as in all the above-mentioned cases, or discontinuous. It may be monotonic, or otherwise, as shown in FIG. 5A. The length of the variation or the slope of mean index variation can be obtained qualitatively by applying rules known in the art for interconnecting fibers having different core diameters. Snyder and Love, in Optical Waveguide Theory, Chapman & Hall, Section 19-3, p. 411 propose the following qualitative criterion:

$$\frac{4\pi r_{core}}{\sqrt{2\Delta(z)}} \frac{V(z)}{W^2(z)} \frac{1}{n^2(z)} \left|\frac{\partial n^2(z)}{\partial(z)}\right| << 1$$

in which $$\Delta(z) = \frac{n_{core}^2 - n_{cladding}^2}{2n_{core}^2},$$

where $n_{core}$ is the core index and $n_{cladding}$ is the cladding index, and in which U, V, and W are the guiding parameters of the fiber.

$$V = \frac{2\pi}{\lambda} r_{core} \cdot \sqrt{n_{core}^2 - n_{cladding}^2}$$

$$U = \sqrt{V^2 - (1.1428V - 0.996)^2}$$

$$W = \sqrt{V^2 - U^2}$$

This formula applies to step index fibers. The invention also applies to fibers of more complex profile. Under such circumstances, variation in modulation at the ends of the grating can be determined experimentally, by measuring losses in the grating. In any event, the invention proposes limiting variations of mean index, and thus the corresponding losses. These losses are preferably less than 0.3 dB.

FIGS. 6 and 7 show the results of the invention. FIG. 6 shows the transfer function of a filter of the invention, transmission is plotted up the ordinate, and wavelength along the abscissa. The fiber used was one of the fibers described in the above-specified patent applications in the name of the Applicant, having a photosensitivity ratio of 50% between the core and the cladding, and an index step $\Delta n e$ of $4 \times 10^{-3}$. The written-in filter was a Bragg filter with a uniform pitch of 533.5 nanometers (nm) written over a length of 5 millimeters (mm). The grating was inclined at an angle of 30° relative to the axis of the fiber. At each end of the filter, modulation amplitude varied linearly from a value of zero to a maximum value approaching $10^{-3}$ over a length of 2.5 mm. The figure shows that insertion losses for the filter are of the order of 0.05 dB. In other words, the losses induced by the filter are very low outside the band in which the filter attenuates.

FIG. 7 is a corresponding graph for a filter that was identical except that it did not present variation in modulation amplitude or mean index at each end. Insertion losses in that filter were about 0.45 dB.

The invention can be implemented using conventional apparatus for irradiating photosensitive fibers in order to write gratings. A phase mask is used in such apparatus between the fiber and the source of ultraviolet light. The invention can be implemented by varying exposure time along the grating or by inserting an amplitude mask between the phase mask and the fiber. The amplitude of index modulation then decreases towards the ends of the grating, thereby enabling a fiber of the invention to be obtained.

The invention applies in particular to reducing insertion losses for the filters of the Applicants' above-mentioned patent applications, which are advantageously used as equalizing filters.

Naturally, the present invention is not limited to the examples and embodiments described and shown, and it can be varied in numerous ways by the person skilled in the art. It applies to types of written-in grating other than those described by way of example.

The invention claimed is:

1. An optical filter having an insertion loss, the optical filter comprising an optical fiber that includes a grating having a first end, a second end, a mean index and an index modulation amplitude, wherein the mean index varies along the grating, diminishing progressively toward the first end such that the insertion loss is less than about 0.3 dB, and the index modulation amplitude varies in a non-monotonic fashion.

2. The optical filter of claim 1, wherein the optical fiber further includes a core, the core having the grating written therein.

3. The optical filter of claim 2, wherein the grating comprises an inclined grating.

4. The optical filter of claim 2, wherein the grating comprises a long period grating.

5. The optical filter of claim 1, wherein the optical fiber further includes a cladding, the cladding having the grating writing therein.

6. The optical filter of claim 5, wherein the grating comprises an inclined grating.

7. The optical filter of claim 5, wherein the grating comprises a long period grating.

8. The optical filter of claim 1, wherein the grating comprises a varying pitch.

9. The optical filter of claim 1, wherein the mean index also diminishes progressively towards the second end.

10. The optical filter of claim 1, wherein the mean index diminishes linearly towards the first end.

11. The optical filter of claim 10, wherein the mean index also diminishes progressively towards the second end.

12. The optical filter of claim 11, wherein the mean index diminishes linearly towards the second end.

13. The optical filter of claim 1, wherein the index modulation amplitude varies along the grating and has a value of about zero at the first end.

14. The optical filter of claim 13, wherein the index modulation amplitude has a value of about zero at the second end.

15. The optical filter of claim 1, wherein the optical filter is included in a gain equalizing filter.

16. The optical filter of claim 15, wherein the gain equalizing filter is included in a transmission system.

* * * * *